UNITED STATES PATENT OFFICE.

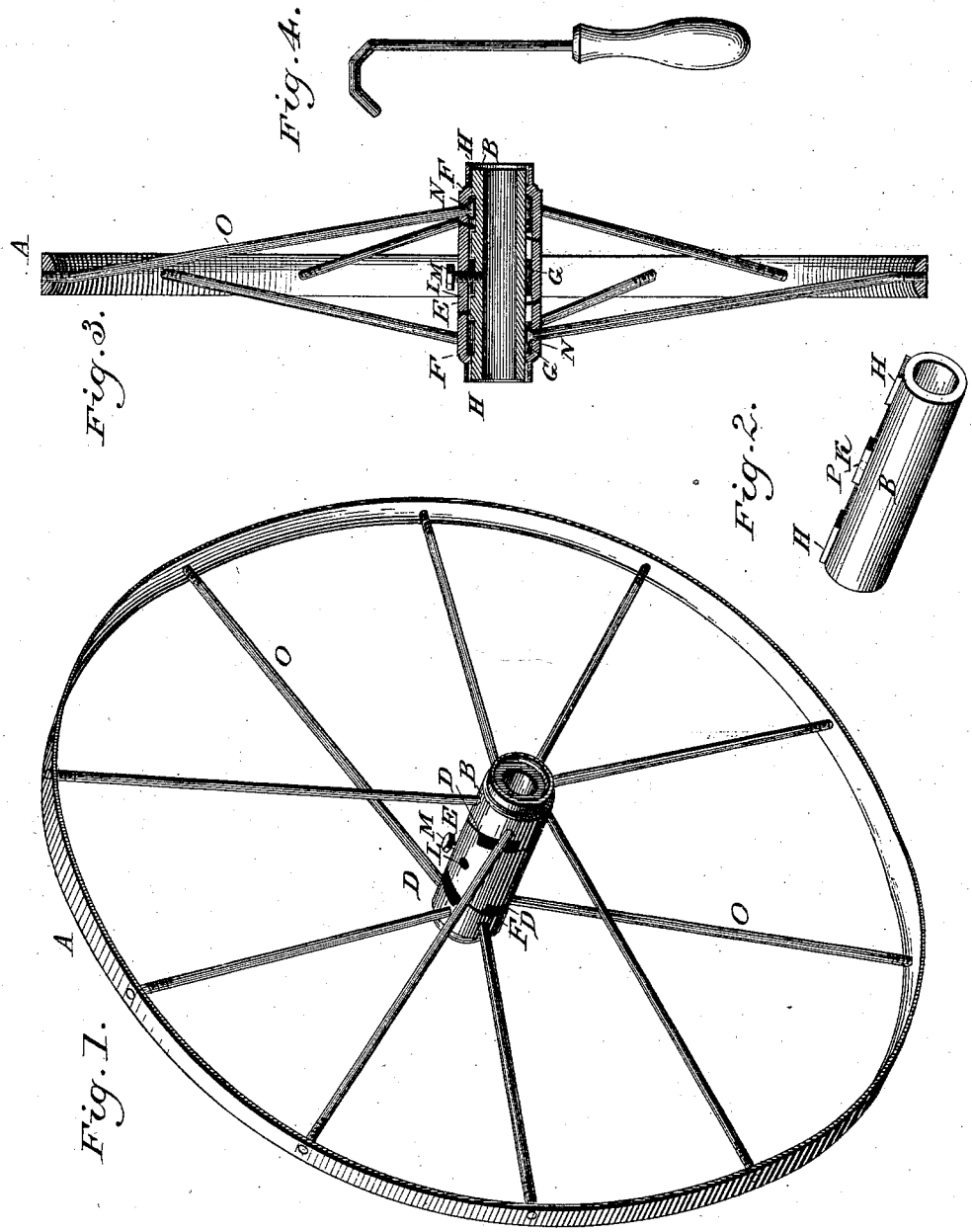

JOSEPH FRENIER, OF LA PORTE, INDIANA.

VEHICLE-WHEEL.

SPECIFICATION forming part of Letters Patent No. 285,401, dated September 25, 1883.

Application filed July 9, 1883. (Model.)

*To all whom it may concern:*

Be it known that I, JOSEPH FRENIER, of La Porte, Indiana, have invented a new and useful Improvement in Vehicle-Wheels, of which the following is a specification.

My invention relates more particularly to wheels which are constructed of metal, or which have metal hubs; and the objects of my improvement are, first, to provide a wheel with a renewable spindle-box; second, to provide a wheel with renewable spokes; third, to provide a means of regulating the tension of the spokes on the rim and hub; and, fourth, to provide a strongly-braced, light, and durable wheel.

Figure 1 is a perspective view of the wheel. Fig. 2 is a perspective view of the spindle-box. Fig. 3 is a diametrical section of the wheel. Fig. 4 is a spanner-wrench used in straining the spokes.

Similar letters refer to similar parts throughout the several views.

The rim A or felly, which may also be the tire, may be formed of half-oval iron or steel, or half-oval pipe.

The spindle-box B may be adapted to a straight spindle, or to a tapered spindle, and may be made of cast-iron. The outer portion of the hub, which incloses the spindle-box, may be in three sections or annular castings, E and F F. There are spoke-holes in each of the castings F F for one-half the number of spokes in the wheel. The outer end of each of the rings F F may be shaped and finished like the ends of an ordinary hub, and the inner end is provided with or terminated by three inclined surfaces, D D D, something like a cam or clutch, and both ends of the ring E may terminate in a similar number of similarly-inclined surfaces. The inner diameter of these rings is such that they will fit snugly over the spindle-box B, and on the inner surface of each is a groove, G. This groove is so placed in each ring that when the hub is put together, before the wheel is tightened up by pressing the outer rings apart, the wedge-shaped ends of the three rings will be in close contact at all points, and at the same time the three grooves G G G will form one continuous groove lengthwise through the hub, and the spoke-holes in the two ends of the hub will alternate with each other in position, as in a dodge-mortise hub. At each end of the box B, on its outer surface, there is a boss or protuberance, H, which fits into the grooves G G. At the middle part of the box B there is another boss, K, in a line with the bosses H H and of the same width. In the middle of the inner surface of the ring E there is an annular chamber or groove, I, at right angles to the groove G. The boss K fits into the groove G in one direction and in the groove I in a crosswise direction.

The spokes O are provided with an upset head or some similar device at one end to fix them in the hub. On the interior surface of each of the castings F F an annular chamber or groove, N N, is provided to receive the head of the spokes, so that the end of the spokes will not extend beyond the inner surface of the rings F F. The outer end of each spoke has a screw-thread cut on it to correspond with and fit in a screw-thread cut in each spoke-hole in the rim. There is a hole, P, in the boss K, having a screw-thread cut in it. Two or three holes, L L, are drilled through the annulus E, and when the wheel is completed and the hub tightened up some one of these holes comes over the hole P. There is a set-screw, M, which fits into the hole P, passing through the hole L, to hold the various parts of the hub in place after the wheel is completed.

The operation of putting the wheel together is as follows: A spoke is inserted in each spoke-hole in the hub by passing the outer end of the spoke through the spoke-hole from the inside. Then the three rings E and F F are placed on the box B, with the ring E between the two other rings, and the hub is placed on an upright mandrel. The outer end of each spoke is screwed into a spoke-hole in the rim, so that all are subjected to about the same tension. Then, with the spanner-wrench R, the annulus E is turned until the ends of the hub are forced apart sufficiently to secure the proper tension on all parts of the wheel, and until one of the holes L L comes over the hole P, into which the set-screw M is then fitted. If it is desired to change the tension thus secured, the set-screw may be removed, the ring E turned back, and then, to increase the tension, the spokes may be screwed farther into the rim, and to diminish it, the spokes may be screwed part way out and the ring E again fastened, as before.

The bosses H H serve to prevent the box B from twisting or turning round in the hub, and the boss K serves to prevent it from slipping endwise.

Materials of any suitable properties and size and shape may be substituted for the materials above mentioned.

To aid in determining the size and proportions of any desired wheel, I give the dimensions of a wheel which I consider to be well adapted to serve as the wheel of a walking corn-cultivator. The diameter is thirty inches. The box is adapted to a spindle one and one-eighth inch in diameter and five inches long. The wall of the box is one-fourth of an inch thick. The outside diameter of the hub F E F is two and one-half inches. The distance between the two rows of spoke-holes in the hub is three and three-eighths inches. The spokes are made of round iron one-fourth of an inch in diameter. The rim is of half-oval iron one and one-fourth inch wide and three-eighths of an inch thick in the middle part, with the flat side outward. The set-screw M is three-eighths of an inch in diameter, with a square head. The wedge-shaped ends D D D are notched in three-eighths of an inch at the deepest part, so that when the wheel is completed there are open spaces between the rings three-eighths of an inch wide. The grooves N N are five-eighths of an inch wide at the surface, one-fourth of an inch deep, and a little over one-fourth of an inch wide at the bottom. This wheel can be made entirely of cast and wrought iron.

A wheel made according to the foregoing specification will have a neater appearance if the portion of the hub between the two rows of spokes is covered with a band.

What I claim as my invention, and desire to secure by Letters Patent, is—

1. The combination, in a wheel, of a renewable box provided with bosses on the exterior surface, and the annular ends of the hub provided with spoke-holes, an internal groove, and cam-shaped or wedge-shaped inner ends, and a cam-like ring placed between the two other rings, provided with an internal longitudinal groove and an internal transverse groove, and with ends notched into wedge-shaped surfaces to fit into and work against the ends of the said other rings, substantially as specified.

2. The combination, in a wheel, of a hub consisting of annular sections, which hold the spokes and inclose the box and hold it in place by means of bosses, and a box so held in place, and renewable spokes held in place by a head at the inner end and a screw at the outer end of each spoke, all adjustable by turning the middle section of the hub, substantially as specified.

JOSEPH FRENIER.

Witnesses:
WM. NILES,
J. H. BAINES.